(12) United States Patent
Kamimura et al.

(10) Patent No.: US 8,293,693 B2
(45) Date of Patent: Oct. 23, 2012

(54) CONDUCTIVE LUBRICANT COMPOSITION

(75) Inventors: Hideto Kamimura, Ichihara (JP); Tatsuya Egawa, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 1167 days.

(21) Appl. No.: 10/551,238

(22) PCT Filed: Apr. 2, 2004

(86) PCT No.: PCT/JP2004/004852
§ 371 (c)(1),
(2), (4) Date: Sep. 28, 2005

(87) PCT Pub. No.: WO2004/090082
PCT Pub. Date: Oct. 21, 2004

(65) Prior Publication Data
US 2006/0199747 A1    Sep. 7, 2006

(30) Foreign Application Priority Data
Apr. 2, 2003    (JP) ................. 2003-099652

(51) Int. Cl.
C10M 133/16    (2006.01)
C10M 105/18    (2006.01)
C10M 125/24    (2006.01)

(52) U.S. Cl. ............ 508/513; 508/461; 508/579

(58) Field of Classification Search ......... 508/528, 508/513, 461, 579
See application file for complete search history.

(56) References Cited

U.S. PATENT DOCUMENTS

| | | | | |
|---|---|---|---|---|
| 5,464,546 A | * | 11/1995 | Bialas et al. | 252/8.84 |
| 5,652,201 A | * | 7/1997 | Papay et al. | 508/228 |
| 6,335,310 B1 | * | 1/2002 | Suekuni et al. | 508/409 |
| 6,528,458 B1 | * | 3/2003 | Tagliamonte et al. | 508/185 |

FOREIGN PATENT DOCUMENTS

| | | | |
|---|---|---|---|
| EP | 1 094 104 A1 | | 4/2001 |
| JP | 10-324883 | | 12/1998 |
| JP | 10324883 A | * | 12/1998 |
| JP | 2001-115180 | | 4/2001 |
| JP | 2001-208069 | | 8/2001 |
| JP | 2001-234187 | | 8/2001 |
| JP | 2001-240885 | | 9/2001 |
| JP | 2002-146374 | | 5/2002 |
| JP | 2002147477 A | * | 5/2002 |
| JP | 2002-206094 | | 7/2002 |
| JP | 2003-3188 | | 1/2003 |
| JP | 2003-193075 | | 7/2003 |
| JP | 2004-51720 | | 2/2004 |
| WO | WO 02079358 A2 | * | 10/2002 |

OTHER PUBLICATIONS

KIC Chemicals, product specification for dioctyl sebacate, retrieved from the internet at http://www.kicgroup.com/dos.htm on Jan. 8, 2009.*

* cited by examiner

*Primary Examiner* — Jim Goloboy
(74) *Attorney, Agent, or Firm* — Oblon, Spivak, McClelland, Maier & Neustadt, L.L.P.

(57) ABSTRACT

The present invention provides a conductive lubricant composition, characterized in that the composition contains a lubricating base oil (A) other than a silicone oil, and a non-metallic antistatic agent (B), and exhibits a kinematic viscosity of 25 mm²/s or less at 40° C., a viscosity index of 100 or higher, a flash point of 150° C. or higher, and a volume resistivity of $1 \times 10^{10} \Omega \cdot cm$ or less at 25° C.

The invention also provides a bearing oil formed from the lubricant composition.

13 Claims, No Drawings

CONDUCTIVE LUBRICANT COMPOSITION

TECHNICAL FIELD

The present invention relates to a conductive lubricant composition and, more particularly, to a conductive lubricant composition suitable for a bearing oil such as a fluid bearing oil or an oil-impregnated sintered bearing oil.

BACKGROUND ART

In recent years, roller bearings such as fluid bearings and oil-impregnated sintered bearings have often been employed as bearings of spindle motors for a magnetic disk, an optical disk, etc., since such roller bearings realize silent operation and durability.

In the above bearings, a shaft is not in direct contact with the bearing inner surface but is in contact therewith by the mediation of lubricant, which sustains a load applied to the shaft, thereby reducing friction between the shaft and the bearing.

Thus, the performance of the bearings greatly depends on the performance of lubricating oil.

Requirements in performance of the lubricating oil for use in the roller bearings include viscosity, durability, and antistatic property.

Among these requirements, viscosity is an essential factor for determining electric power loss and bearing toughness of a spindle motor. In a recent year-by-year trend toward increasing rotation speed (to a range of 10,000 to 50,000 rpm) of spindle motors for use in information-related apparatuses (particularly CD apparatuses, DVD apparatuses, HDDs, and laser printers (polygon mirror), a lubricating oil of low viscosity is selected so as to reduce electric power loss during high-speed operation.

In general, when the viscosity of lubricating oil decreases, the amount of vaporized oil increases.

Thus, when a low-viscosity lubricating oil is employed, loss of the lubricating oil increases, resulting in a lubrication failure, and in the worst case, damage to bearings.

Under such circumstances, there have been proposed a large number of lubricating base oils for bearings satisfying both low viscosity and low volatility; for example, ester compounds (Japanese Patent Application Laid-Open (kokai) No. 11-315292, p. 1), monoesters (ditto No. 2000-63860, p. 1), carbonate esters (ditto No. 2001-107046, p. 1), use of poly (α-olefin) and an ester in combination (ditto Nos. 2001-172656, p. 1 and 2001-240885, p. 1), use of a diester and a polyol ester in combination (ditto No. 2001-279284, p. 1), neopentyl glycol esters (ditto No. 2001-316687, p. 1), an aromatic ester or diester (ditto No. 2002-97482, p. 1), monoesters (ditto No. 2002-146381, paragraph [0007]), and specific diesters formed from oxalic acid, malonic acid, succinic acid, etc. (ditto No. 2002-155944, p. 1).

Meanwhile, in a roller bearing, a shaft and a bearing are completely separated by lubricating oil film.

Therefore, static electricity tends to be generated by movement of fluid. When the thus-generated electricity is discharged, essential electronic parts and magnetic parts (e.g., MR head of a hard disk drive) may become disordered.

Thus, static charge of roller bearings for use in precision machines such as a magnetic disk apparatus must be caused to flow to ground, to thereby protect electronic and magnetic apparatuses against static electricity.

From this viewpoint, the aforementioned conventional bearing lubricating oils still have the problem that they have problematically large volume resistivity, which readily induces generation of static electricity, although they satisfy both low viscosity and low volatility.

In order to solve the above problem, a lubricating oil to which conductive microparticles of a metal or a metal oxide have been added is reported (see, for example, Japanese Patent Application Laid-Open (kokai) No. 10-30096, p. 1 or 11-315292, paragraph [0023]). However, when a lubricating oil containing such microparticles is employed, microparticles present on the sliding surface cause anomalous wear of the bearing during start and stop of the motor.

A lubricating oil containing a metal organic salt such as sulfonate, phenate, or salicylate, instead of such metallic particles, has also been proposed (see Japanese Patent Application Laid-Open (kokai) 2001-234187, p. 1).

However, the above metal organic salt antistatic agent can exhibit antistaticity only when added in a large amount.

In addition, during long-term use of the lubricating oil, the antistatic agent problematically forms an inorganic salt (sludge), which is insoluble in oil.

The present invention has been accomplished in an attempt for solving the aforementioned problems, and an object of the present invention is to provide a conductive lubricant composition which, without impairing roller bearing oil performance, prevents anomalous wearing, generation of sludge, and occurrence of static electricity which would otherwise be generated by movement of fluid.

DISCLOSURE OF THE INVENTION

The present inventors have carried out extensive studies in order to attain the aforementioned object, and have found that the above object can be attained by adding a non-metallic antistatic agent to a lubricating oil, and limiting specific characteristics to fall within specific ranges. The present invention has been accomplished on the basis of this finding.

Accordingly, the present invention provides a conductive lubricant composition, characterized in that the composition comprises a lubricating base oil (A) other than a silicone oil, and a non-metallic antistatic agent (B), and exhibits a kinematic viscosity of 25 mm$^2$/S or less at 40° C., a viscosity index of 100 or higher, a flash point of 150° C. or higher, preferably 200° C. or higher, and a volume resistivity of $1 \times 10^{10}$ Ω·cm or less at 25° C.

The present invention also provides a bearing oil comprising the lubricant composition.

BEST MODES FOR CARRYING OUT THE INVENTION

The conductive lubricant composition of the present invention comprises a lubricating base oil (A) and a non-metallic antistatic agent (B). The composition must satisfy at least the following characteristic requirements (1) to (4).

(1) The lubricant composition of the present invention essentially exhibits a kinematic viscosity of 25 mm$^2$/s or less at 40° C., preferably 22 mm$^2$/s or less, particularly preferably 10 mm$^2$/s or less.

When the kinematic viscosity is higher than 25 mm$^2$/S, the lubricating base oil has an excessively high viscosity, thereby failing to attain sufficient electricity-saving effect.

(2) The lubricant composition of the present invention essentially exhibits a viscosity index of 100 or higher, preferably 120 or higher, more preferably 125 or higher, particularly 130 or higher.

When the viscosity index is lower than 100, change in viscosity with respect to temperature change increases.

(3) The lubricant composition of the present invention essentially exhibits a flash point (as determined through COC method) of 150° C. or higher.

When the flash point is lower than 150° C., a large amount of lubricating base oil is vaporized during use, thereby shortening the life time of the lubricant composition.

(4) The lubricant composition of the present invention essentially exhibits a volume resistivity of $1 \times 10^{10} \Omega \cdot cm$ or less at 25° C.

When the volume resistivity is in excess of $1 \times 10^{10}$ $\Omega \cdot cm$, antistatic performance decreases.

Moreover, the lubricating base oil of the present invention preferably exhibits a pour point, as measured in accordance with JIS K2265, of −30° C. or lower, more preferably −40° C. or lower.

The lubricating base oil, serving as component (A) employed in the lubricant composition of the present invention satisfying the above requirements, preferably contains a compound formed of carbon, hydrogen, and oxygen (hereinafter the compound is referred to as "an oxygen-containing compound").

Specifically, the oxygen-containing compound is preferably an ether ether, an ester, or a compound having a carbonate moiety, with an ether compound being particularly preferred.

Specific examples of the ester compound which is preferably employed include polyol esters produced through condensation between a polyhydric alcohol such as neopentyl glycol, trimethylolpropane, or pentaerythritol and a fatty acid; diesters produced through condensation between a dibasinc acid such as adipic acid or sebacic acid and a monohydroc alcohol; and monoesters produced through a fatty acid and a monohydric alcohol.

The ether compound is preferably any of the compounds represented by the following formula (I), or a mixture thereof.

$$R^1\text{—O—}(R^2\text{—O})_a\text{—}(R^3\text{—O})_b\text{—}(R^4\text{—O})_c\text{—}R^5 \quad (I)$$

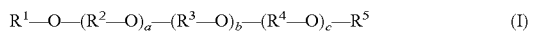

In formula (I), each of $R^1$ and $R^5$ represents hydrogen, a C1-C24 alkyl group, a phenyl group, or a C7-C24 alkylaryl group; each of $R^2$, $R^3$, and $R^4$ represents a C2-C18 alkylene group; each of a, b, and c is 0 to 8 (preferably 0 to 5); and the sum of a to c is 0 to 8 (preferably 0 to 5).

The units ($R^2$—O), ($R^3$—O), and ($R^4$—O) may be identical to or different from one another.

The alkyl group represented by $R^1$ or $R^5$ may be linear, branched, or cyclic. Examples of the alkyl group include methyl, ethyl, propyl, butyl, hexyl, 2-ethylhexyl, 3,5,5-trimethylhexyl, heptyl, octyl, 3,7-dimethyloctyl, nonyl, 2-pentylnonyl, decyl, 2-octylundecanyl, dodecyl, cyclopentyl, and cyclohexyl. Among them, 2-ethylhexyl, 3,5,5-trimethylhexyl, octyl, 3,7-dimethyloctyl, nonyl, 2-pentylnonyl, decyl, and 2-octylundecanyl are particularly preferred.

Examples of the alkylaryl group represented by $R^1$ or $R^5$ include alkylphenyl and alkylnaphthyl. Exampled of the alkyl moiety of the alkylaryl group include the groups described above. Among them, octyl, decyl, and dodecyl are particularly preferred.

The alkylene group represented by $R^2$, $R^3$, or $R^4$ may be linear, branched, or cyclic. Examples of the alkylene group include ethylene, propylene, butylene, hexylene, nonylene, decylene, dodecylene, cyclopentylene, and cyclohexylene. Of these, ethylene, propylene, butylene, hexylene, nonylene, and decylene are particularly preferred.

The ether compound is preferably a monoether compound represented by formula (II).

$$R^6\text{—O—}R^7 \quad (II)$$

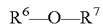

In formula (II), one of $R^6$ and $R^7$ is a C1 to C24 alkyl group, and the other is a C1 to C24 alkyl group, a phenyl group, or a C7 to C24 alkylaryl group.

The ether compounds represented by formulas (I) and (II) may be used singly or in combination.

These ether compounds may be used in combination with the ester compound.

The ether compound and/or the ester compound may be incorporated in a total amount of 20 to 80 mass % based on the hydrocarbon base material.

The lubricating base oil of the present invention may contain, in addition to the oxygen-containing compound, any of a variety of hydrocarbon compounds.

In this case, the lubricating base oil must satisfy the above-mentioned requirements (1) to (4).

No particular limitation is imposed on the hydrocarbon compound to be mixed with the oxygen-containing compound, so long as the hydrocarbon compound does not impair the effects of the lubricating base oil of the present invention. Examples of the hydrocarbon compound include mineral oils (e.g., 80 neutral mineral oils), poly(α-olefin) (e.g., viscosity grade 4 mm²/s or 8 mm²/s (100° C.)), ethylene-propylene copolymers, and alkylbenzenes (e.g., propylbenzene and butylbenzene). Of these, poly(α-olefin) is preferred.

The lubricating base oil of the present invention excludes silicone oil.

The reason for exclusion is that, even though silicone oil satisfies the aforementioned requirements, silicone oil exhibits poor lubricity.

In the present invention, the non-metallic antistatic agent (B) to be added to the lubricating base oil (A) is preferably an amine derivative, a succinic acid derivative, a poly(oxyalkylene)glycol, or a polyhydric alcohol partial ester. The antistatic agent is preferably incorporated in an amount of 0.01 to 10 mass % on the basis of entire amount of the composition.

Specific examples of the amine derivative include poly (oxyethylene)alkylamines represented by the following formula:

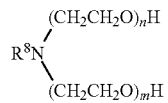

(wherein R8 represents a C1 to C18 alkyl group), poly (oxyethylene)alkylamides represented by the following formula:

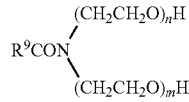

(wherein R9 represents a C1 to C18 alkyl group), and condensates produced from a polyethylenepolyamine such as tetraethylenepentamine (TEPE) and a fatty acid. Of these, a condensate produced from TEPE and stearic acid is preferred.

Examples of preferred succinic acid derivatives include polybutenylsuccinimide.

The poly(oxyalkylene)glycol is preferably a compound represented by formula (III), or a mixture thereof.

$$R^1\text{—O—}(R^2\text{—O})_d\text{—}(R^3\text{—O})_e\text{—}(R^4\text{—O})_f\text{—}R^5 \quad (III)$$

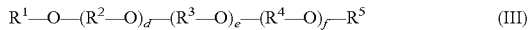

In formula (III), $R^1$ to $R^5$ have the same meanings as defined in relation to formula (I); each of d, e, and f is 0 to 50; and the sum of d to f is 9 to 50.

The units ($R^2$—O), ($R^3$—O), and ($R^4$—O) may be identical to or different from one another.

Among these compounds, poly(oxyethylene)alkyl ether $R^{10}(CH_2CH_2O)_nH$ (wherein $R^{10}$ represents a C1 to C18 alkyl group, and n is a number of 1 to 10); poly(oxyethylene)alkyl phenyl ether $R^{11}$-Q-O$(CH_2CH_2O)_nH$ (wherein $R^{11}$ is a C1 to C18 alkyl group, Q represents an aromatic residue, and n is a number of 1 to 10); and poly(oxyethylene)glycol fatty acid ester $R^{12}COO(CH_2CH_2O)_nH$ (wherein $R^{12}$ is a C1 to C18 alkyl group, and n is a number of 1 to 10) are more preferred.

Examples of the polyhydric alcohol partial ester include sorbitan fatty acid esters such as sorbitan monoleate and sorbitan dioleate represented by the following formula:

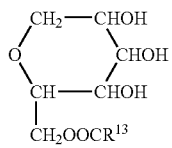

(wherein $R^{13}$ is a C1 to C18 alkyl group, and each of n and m is a number of 1 to 10); glycerin fatty acid esters such as glycerin monoleate and glycerin dioleate represented by the following formula:

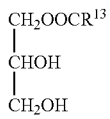

(wherein $R^{14}$ is a C1 to C18 alkyl group, and each of n and m is a number of 1 to 10); and partial ester compounds produced from a polyhydric ester such as pentyl glycol, trimethylolpropane, or pentaerythritol and a C1 to C24 fatty acid.

Among lubricant compositions falling within the scope of the present invention, a composition including a monoether having alkyl groups (component A) and a condensate produced from tetraethylenepentamine and a fatty acid (e.g., stearic acid (component (B)) is particularly preferred, from the viewpoint of low viscosity, low volatility, heat resistance, and antistaticity.

Preferably, an additive other than the aforementioned additive is added, in accordance with needs, to the lubricating base oil of the present invention, to thereby form a lubricant composition, which is employed as uses of interest.

Any of known additives may be used, and examples include antioxidants, oiliness agents, friction reducers, rust preventives, metal deactivators, defoaming agents, and viscosity index improvers, as described below.

(1) Examples of the antioxidants include amine-based antioxidants, phenol-based antioxidants, and sulfur compounds.

Examples of the amine-based anti-oxidants include monoalkyldiphenylamines such as monoctyldiphenylamine and monononyldiphenylamine; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, and 4,4'-dinonyldiphenylamine; polyalkyldiphenylamines such as tetrabutyldiphenylamine, tetrahexyldiphenylamine, tetraoctyldiphenylamine, and tetranonyldiphenylamine; and naphtylamines such as α-naphthylamine, phenyl-α-naphtylamine, butylphenyl-α-naphtylamine, pentylphenyl-α-naphtylamine, hexylphenyl-α-naphtylamine, heptylphenyl-α-naphtylamine, octylphenyl-α-naphtylamine, and nonylphenyl-α-naphtylamine. Of these, dialkyldiphenylamines are preferred.

The above amine-based anti-oxidants may be used singly or in combination of two or more species.

Examples of the phenol-based anti-oxidants include monophenolic anti-oxidants such as 2,6-di-tert-butyl-4-methylphenol, 2,6-di-tert-butyl-4-ethylphenol, and 2,6-di-tert-butyl-p-cresol; and diphenolic anti-oxidants such as 4,4'-methylenebis(2,6-di-tert-butylphenol) and 2,2'-methylenebis(4-ethyl-6-tert-butylphenol).

The above phenol-based anti-oxidants may be used singly or in combination of two or more species.

Examples of the sulfur compounds include phenothiazine, pentaerythritol-tetrakis(3-laurylthiopropionate), bis(3,5-tert-butyl-4-hydroxybenzyl) sulfide, thiodiethylenebis(3-(3,5-di-tert-butyl-4-hydroxyphenyl)) propionate, and 2,6-di-tert-butyl-4-(4,6-bis(octylthio)-1,3,5-triazine-2-methylamino) phenol.

The antioxidant(s) are preferably incorporated in an amount of 0.01 to 10 mass % based on the total amount of the composition, particularly preferably 0.03 to 5 mass %.

(2) Examples of the oiliness agents aliphatic saturated and unsaturated monocarboxylic acids such as stearic acid and oleic acid; polymerized fatty acids such as dimer acid and hydrogenated dimer acid; hydroxyfatty acids such as ricinoleic acid and 12-hydroxystearic acid; aliphatic saturated and unsaturated monoalcohols such as lauryl alcohol and oleyl alcohol; aliphatic saturated and unsaturated monoamines such as stearylamine and oleylamine; and aliphatic saturated and unsaturated monocarbamides such as laurylamide and oleylamide.

The oiliness agent(s) are preferably incorporated in an amount of 0.01 to 10 mass % based on the total amount of the composition, particularly preferably 0.1 to 5 mass %.

(3) Examples of the friction modifiers which may be employed include agents generally employed as oiliness agents or extreme pressure agents, more particularly, phosphate esters, amine salts of phosphate ester, and sulfur-containing extreme pressure agents.

The phosphate esters include phosphate esters, acid phosphate esters, phosphite esters, and acid phosphite esters represented by the following formulas (IV) to (VIII):

(IV)

(V)

(VI)

(VII)

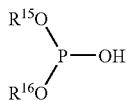

(wherein $R^{15}$ to $R^{17}$, which may be identical to or different from one another, each represents a C4 to C30 alkyl group, an alkenyl group, an alkylaryl group, or an arylalkyl group).

Examples of the phosphate esters include triaryl phosphates, trialkyl phosphates, trialkylaryl phosphates, triarylalkyl phosphates, and trialkenyl phosphates. Specific examples include triphenyl phosphate, tricresyl phosphate, benzyl diphenyl phosphate, ethyl diphenyl phosphate, tributyl phosphate, ethyl dibutyl phosphate, cresyl diphenyl phosphate, dicresyl phenyl phosphate, ethylphenyl diphenyl phosphate, diethylphenyl phenyl phosphate, propylphenyl diphenyl phosphate, dipropylphenyl phenyl phosphate, triethylphenyl phosphate, tripropylphenyl phosphate, butylphenyl diphenyl phosphate, dibutylphenyl phenyl phosphate, tributylphenyl phosphate, trihexyl phosphate, tri(2-ethylhexyl) phosphate, tridecyl phosphate, trilauryl phosphate, trimyristyl phosphate, tripalmityl phosphate, tristearyl phosphate, and trioleyl phosphate.

Examples of the acid phosphate esters include 2-ethylhexyl acid phosphate, ethyl acid phosphate, butyl acid phosphate, oleyl acid phosphate, tetracosyl acid phosphate, isodecyl acid phosphate, lauryl acid phosphate, tridecyl acid phosphate, stearly acid phosphate, and isostearyl acid phosphate.

Examples of the phosphite esters include triethyl phosphite, tributyl phosphite, triphenyl phosphite, tricresyl phosphite, tri(nonylphenyl) phosphite, tri(2-ethylhexyl) phosphite, tridecyl phosphite, trilauryl phosphite, triisooctyl phosphite, diphenyl isodecyl phosphite, tristearyl phosphite, and trioleyl phosphite.

Examples of the acid phosphite esters include dibutyl hydrogen phosphite, dilauryl hydrogen phosphite, dioleyl hydrogen phosphite, distearyl hydrogen phosphite, and diphenyl hydrogen phosphite.

Among these phosphate esters, tricresyl phosphate and triphenyl phosphate are preferred.

Examples of the amines which form amine salts with the phosphate esters include monosubstituted amines, disubstituted amines, and trisubstituted amines, which are represented by formula (IX):

(wherein $R^{18}$ represents a C3 to C30 alkyl group or alkenyl group, a C6 to C30 aryl group or arylalkyl group, or a C2 to C30 hydroxyalkyl group; p is 1, 2, or 3; when a plurality of $R^{18}$s are present, these $R^{18}$s may be identical to or different from one another).

The C3 to C30 alkyl or alkenyl group represented by $R^{18}$ in formula (IX) may be linear, branched, or cyclic.

Examples of the monosubstituted amines include butylamine, pentylamine, hexylamine, cyclohexylamine, octylamine, laurylamine, stearylamine, oleylamine, and benzylamine. Examples of the disubstituted amines include dibutylamine, dipentylamine, dihexylamine, dicyclohexylamine, dioctylamine, dilaurylamine, distearylamine, dioleylamine, dibenzylamine, stearylmonoethanolamine, decylmonoethanolamine, hexylmonopropanolamine, benzylmonoethanolamine, phenylmonoethanolamine, and tolylmonopropanol. Examples of the trisubstituted amines include tributylamine, tripentyl amine, trihexylamine, tricyclohexylamine, trioctylamine, trilaurylamine, tristearylamine, trioleylamine, tribenzylamine, dioleylmonoethanolamine, dilaurylmonopropanolamine, dioctylmonoethanolamine, dihexylmonopropanolamine, dibutylmonopropaolamine, oleyldiethanolamine, stearyldipropanolamine, lauryldiethanolamine, octyldipropanolamine, butyldiethanolamine, benzyldiethanolamine, phenyldiethanolamine, tolyldipronanolamine, xylyldiethanolamine, triethanolamine, and tripropanolamine.

The sulfur-containing extreme pressure may be any compound having a sulfur atom in the molecule thereof, so long as the compound can be dissolved or uniformly dispersed in a lubricating base oil and can exhibit extreme pressure performance and excellent friction characteristics.

Examples of the sulfur-containing compound include sulfidized fats and oils, sulfidized fatty acid, sulfidized esters, sulfidized olefins, dihydrocarbyl polysulfides, thiadiazole compounds, thiophosphate esters (thiophosphites and thiophosphates), alkyl thiocarbamoyl compounds, thiocarbamate compounds, thioterpene compounds, and dialkyl thiodipropionate compounds.

The sulfidized fats and oils are produced through reaction of a fat or an oil (e.g., lard, whale oil, vegetable oil, or fish oil) with sulfur or a sulfur-containing compound. Although no particular limitation is imposed on the sulfur content, the content preferably 5 to 30 mass %.

Specific examples include sulfidized lard, sulfidized rape seed oil, sulfidized castor oil, sulfidized soy bean oil, and sulfidized rice bran oil.

Examples of the sulfidized fatty acids include sulfidized oleic acid. Examples of the sulfidized esters include sulfidized methyl oleate and sulfidized octyl ester of rice bran fatty acid.

Examples of the sulfidized olefins include compounds represented by the following formula (X):

(wherein $R^{19}$ represents a C2 to C15 alkenyl group, $R^{20}$ represents a C2 to C15 alkyl group or alkenyl group; and q is an integer of 1 to 8).

These compounds are produced reaction between a C2 to C15 olefin or a dimer to tetramer thereof and a sulfidizing agent such as sulfur or sulfur chloride. Preferred olefins are propylene, isobutene, and diisobutene.

Examples of the dihydrocarbyl polysulfides include compounds represented by the following formula (XI):

(wherein $R^{21}$ and $R^{22}$, which may be identical to or different from each other, each represents a C1 to C20 alkyl group or cyclic alkyl group, a C6 to C20 aryl group, a C7 to C20 alkyl aryl group, or a C7 to C20 arylalkyl group; and r is an integer of 1 to 8).

When each of $R^{21}$ and $R^{22}$ an alkyl group, the compound is called alkyl sulfide.

Examples of the group represented by $R^{21}$ or $R^{22}$ in formula (XI) include methyl, ethyl, n-propyl, isopropyl, n-butyl, isobutyl, sec-butyl, tert-butyl, pentyl groups, hexyl groups, heptyl groups, octyl groups, nonyl groups, decyl groups, dodecyl groups, cyclohexyl, cyclooctyl, phenyl, naphthyl, tolyl, xylyl, benzyl, and phenetyl.

Examples of preferred dihydrocarbyl polysulfides include dibenzyl polysulfides, dinonyl polysulfides, dodecyl polysulfides, dibutyl polysulfides, dioctyl polysulfides, diphenyl polysulfides, and dicyclohexyl polysulfided.

Examples of preferred thiadiazole compounds include 1,3,4-thiadiazole, 1,2,4-thiadiazole compound, and 1,4,5-thiadiazole represented by the following formula (XII):

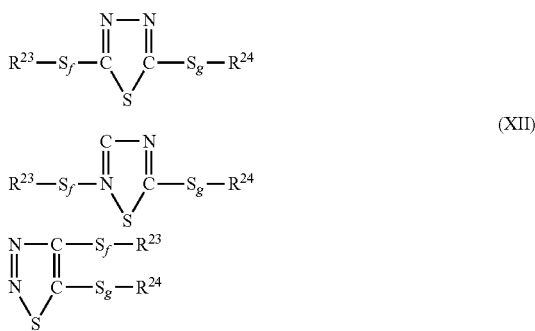

(XII)

(wherein each of $R^{23}$ and $R^{24}$ represents a hydrogen atom, a C1 to C20 hydrocarbon group; and each of f and g is an integer of 0 to 8).

Specific examples of preferred thiadiazole compounds include 2,5-bis(n-hexyldithio)-1,3,4-thiadiazole, 2,5-bis(n-octyldithio)-1,3,4-thiadiazole, 2,5-bis(n-nonyldithio)-1,3,4-thiadiazole, 2,5-bis(1,1,3,3-tetramethylbutyldithio)-1,3,4-thiadiazole, 3,5-bis(n-hexyldithio)-1,2,4-thiadiazole, 3,5-bis(n-octyldithio)-1,2,4-thiadiazole, 3,5-bis(n-nonyldithio)-1,2,4-thiadiazole, 3,5-bis(1,1,3,3-tetramethylbutyldithio)-1,2,4-thiadiazole, 4,5-bis(n-hexyldithio)-1,2,3-thiadiazole, 4,5-bis(n-octyldithio)-1,2,3-thiadiazole, 4,5-bis(n-nonyldithio)-1,2,3-thiadiazole, and 4,5-bis(1,1,3,3-tetramethylbutyldithio)-1,2,3-thiadiazole.

Examples of the thiophosphate esters include alkyl trithiophosphites, aryl or alkyl arylthiophosphates, dilauryl dithiophosphate zinc salts, with lauryl trithiophosphites and triphenyl thiophosphate being particularly preferred.

Examples of the alkyl thiocarbamoyl compounds include compounds represented by the following formula (XIII):

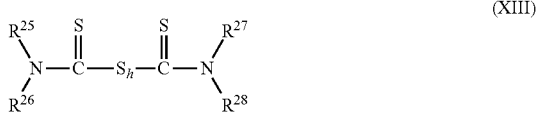

(XIII)

(wherein each of $R^{25}$ to $R^{28}$ represents a C1 to C20 alkyl group, and h is an integer of 1 to 8).

Examples of preferred alkyl thiocarbamoyl compounds include bis(dimethylthiocarbamoyl)monosulfide, bis(dibutylthiocarbamoyl)monosulfide, bis(dimethylthiocarbamoyl)disulfide bis(dibutylthiocarbamoyl)disulfide, bis(diamylthiocarbamoyl) disulfide, and bis(octylthiocarbamoyl) disulfide.

Examples of the thiocarbamate compound compounds include zinc dialkyl thithiacarbamate. Examples of the thioterpene compounds include a reaction product of phosphorus pentasulfide and pinene. Examples of the dialkyl thiodipropionate compounds include dilauryl thiodipropionate and distearyl thiodipropionate.

Among them, thiadiazole compounds and benzyl sulfide are preferred, from the viewpoint of extreme pressure performance, friction characteristics, and stability against thermal oxidation, etc.

The friction modifier(s) are preferably incorporated in an amount of 0.01 to 10 mass % based on the total amount of the composition, particularly preferably 0.05 to 5 mass %.

When the amount is less than 0.01 mass %, improvement of friction characteristics by virtue of a synergistic effect with other components may be insufficient, whereas when the amount is in excess of 10 mass %, improvement of the effect commensurate with addition may fail to be attained.

(4) Examples of rust preventives which may be employed include alkyl and alkenyl succinate derivatives such as dodecenyl succinate half esters, otcadecenyl succinic anhydride, and dodecenylsuccinamide; polyhydric alcohol partial esters such as sorbitan monooleate, glycerin monoolate, and pentaerythritol monooleate; amines such as rosin amines and N-oleylsarcosine; and dialkyl phosphite amine salts.

The rust preventive(s) are preferably incorporated in an amount of 0.01 to 5 mass % based on the total amount of the composition, particularly preferably 0.05 to 2 mass %.

(5) Examples of the metal deactivator which may be employed in the invention include benzotriazoles, thiadiazoles, and gallic acid esters.

The metal deactivator(s) are preferably incorporated in an amount of 0.01 to 0.4 mass % based on the total amount of the composition, particularly preferably 0.01 to 0.2 mass %.

(6) Examples of the defoaming agent which may be employed in the invention include liquid silicone, and thus methylsilicone, fluorosilicone, and polyacrylate may be employed.

The defoaming agent(s) are preferably incorporated in an amount of 0.0005 to 0.01 mass % based on the total amount of the composition.

(7) Examples of the viscosity index improver which may be employed in the present invention include olefin copolymers such as poly(alkyl methacrylate), polyalkylstyrene, polybutene, ethylene-propylene copolymer, styrene-diene copolymer, and styrene-maleic anhydride ester copolymer.

The viscosity index improver(s) are preferably incorporated in an amount of 0.1 to 15 mass % based on the total amount of the composition, particularly preferably 0.5 to 7 mass %.

The conductive lubricant composition of the present invention is suitably employed as a bearing oil such as a fluid bearing oil or an oil-impregnated sintered bearing oil.

The present invention will next be described in more detail by way of examples, which should not be construed as limiting the invention thereto.

1. Characteristics of Lubricating Oils were Determined through the Following Methods (1) Kinematic Viscosity
Determined at 40° C. in accordance with JIS K2283
(2) Viscosity Index
Determined in accordance with JIS K2283
(3) Flash Point (COC Method)
Determined in accordance with JIS K2265
(4) Pour Point
Determined in accordance with JIS K2269
(5) Volume Resistivity
Determined in accordance with JIS C2102
(6) Thin Film Residue Test (Percent Oil Retention, Heat Resistance Evaluation)

A contained and a thermostat air bath, which are stipulated in the lubricating oil stability test (JIS K2504), were employed. A sample (1 g) was left to stand at 80° C. for 1,000 hours, followed by measuring the amount of remaining oil. Percent oil retention was obtained from the amount.

Appearance of the oil sample after a 1,000-hour test was observed, and formation of sludge insoluble in the oil was checked.

During the test, air was continuously fed at 10 L/hr to the thermostat air bath.

2. Structural Analysis

The compounds produced in the following Production Examples were identified to have a purity of 99% or higher on the basis of a peak area obtained by use of a gas chromatograph (Hitachi: model 263-70, column: OV-1 packed column (2 m), product of GL Science Inc.). The structure of each compound was determined by use of a nuclear magnetic resonance apparatus ($^1$H-NMR, $^{13}$C-NMR: GSX400, product of JEOL Ltd.).

3. PRODUCTION EXAMPLES

Production Example 1

2-Octyl-1-dodecanol (300 g), 1-bromooctane (300 g), tetrabutylammonium bromide (30 g), and an aqueous sodium hydroxide solution (500 g) (sodium hydroxide (150 g) dissolved in water (350 g)) were placed in a 2-L glass flask, and the mixture was allowed to react under stirring for 20 hours at 50° C.

After completion of reaction, the reaction mixture was transferred to a separating funnel, and the aqueous layer was separated through filtration. The remaining organic layer was washed five times with water (500 mL).

The organic layer was distilled under reduced pressure, to thereby separate an ether compound having the following structure.

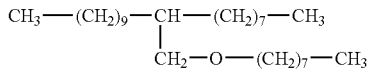

Production Example 2

2-Hexyl-1-decanol (300 g), 1-bromodecane (300 g), tetrabutylammonium bromide (30 g), and a 30% aqueous sodium hydroxide solution (500 g) (sodium hydroxide (150 g) dissolved in water (350 g)) were placed in a 2-L glass flask, and the mixture was allowed to react under stirring for 20 hours at 50° C.

After completion of reaction, the reaction mixture was transferred to a separating funnel, and the aqueous layer was separated through filtration. The remaining organic layer was washed five times with water (500 mL).

The organic layer was distilled under reduced pressure, to thereby separate an ether compound having the following structure.

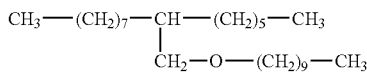

Production Example 3

2-Octyl-1-dodecanol (300 g), 1-bromodecane (300 g), tetrabutylammonium bromide (30 g), and a 30% aqueous sodium hydroxide solution (500 g) (sodium hydroxide (150 g) dissolved in water (350 g)) were placed in a 2-L glass flask, and the mixture was allowed to react under stirring for 20 hours at 50° C.

After completion of reaction, the reaction mixture was transferred to a separating funnel, and the aqueous layer was separated through filtration. The remaining organic layer was washed five times with water (500 mL).

The organic layer was distilled under reduced pressure, to thereby separate an ether compound having the following structure.

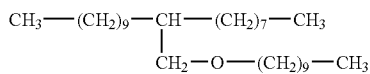

4. Base Oils and Additives

Base oils and additives employed in the following Examples and Comparative Examples are listed in Tables 1 and 2.

TABLE 1

| Base oil | Compounds |
|---|---|
| Base oil A-1 | Compound synthesized in Production Example 1 |
| Base oil A-2 | Compound synthesized in Production Example 2 |
| Base oil A-3 | Compound synthesized in Production Example 3 |
| Base oil B | Neopentyl glycol dipelargonate |
| Base oil C | Dioctyl sebacate |
| Base oil D | 1-Dodecene dimer, polyα-olefin |
| Base oil E | High-pure mineral oil obtained through hydroreformation of paraffin crude oil |

TABLE 2

| Additive | Compounds |
|---|---|
| Antioxidant | Phenyl α-naphtylamine |
| Rust preventive | Sorbitan monooleate |
| Friction modifier A | di(mono)methyl acid phosphate amine salt [mono:di = 50:50(mol)] |
| Friction modifier B | Di-t-nonyl polysulfide |
| Antistatic agent A | Neutral barium sulfonate (base value 1) |
| Antistatic agent B | polybutenylsuccinimide |
| Antistatic agent C | Tetraethylenepentamine-stearic acid condensate |

EXAMPLES 1 TO 12 AND COMPARATIVE EXAMPLES 1 TO 6

Lubricant compositions were prepared in accordance with the formulations listed in Tables 3, and the aforementioned characteristics (1) to (6) were determined.

The results are shown in Tables 3.

TABLE 3-1

| Lubricant composition (parts by mass) | Ex. 1 | Ex. 2 | Ex. 3 | Ex. 4 | Ex. 5 | Ex. 6 |
|---|---|---|---|---|---|---|
| Base oil A-1 | 99.8 | | | | | |
| Base oil A-2 | | 98.8 | 98.8 | | | |
| Base oil A-3 | | | | 98.8 | | |
| Base oil B | | | | | | 98.8 |

TABLE 3-1-continued

| Lubricant composition (parts by mass) | Ex. 1 | Ex. 2 | Ex. 3 | Ex. 4 | Ex. 5 | Ex. 6 |
|---|---|---|---|---|---|---|
| Base oil C | | | | | | 98.8 |
| Base oil D | | | | | | |
| Base oil E | | | | | | |
| Anti-oxidant | | | 1 | 1 | 1 | 1 |
| Rust preventive | | | | | | |
| Friction modifier A | | | | | | |
| Friction modifier B | | | | | | |
| Antistatic agent A | | | | | | |
| Antistatic agent B | | | | 0.2 | | |
| Antistatic agent C | 0.2 | 0.2 | 0.2 | | 0.2 | 0.2 |
| (Total) | 100 | 100 | 100 | 100 | 100 | 100 |
| Kinematic viscosity (mm$^2$/s) at 40° C. | 9.79 | 8.387 | 8.41 | 11.73 | 8.75 | 11.6 |
| Viscosity index | 138 | 129 | 129 | 146 | 136 | 153 |
| Flash point (COC method) (° C.) | 212 | 209 | 207 | 218 | 220 | 220 |
| Pour point (° C.) | −30 | −45 | −45 | −27.5 | −40 | −50> |
| Volume resistivity (×10$^{10}$ Ω·cm) | 0.21 | 0.12 | 0.1 | 0.38 | 0.22 | 0.14 |
| Thin film residue test (80° C., 500 hr) | | | | | | |
| Percent oil retention (mass %) | 94.54 | 88.53 | 95.34 | 98.47 | 94.63 | 99.5 |
| Appearance (sludge) | No | No | No | No | No | No |

TABLE 3-2

| Lubricant composition (parts by mass) | Ex. 7 | Ex. 8 | Ex. 9 | Ex. 10 | Ex. 11 | Ex. 12 |
|---|---|---|---|---|---|---|
| Base oil A-1 | | | | | | |
| Base oil A-2 | 68.8 | 68.8 | 97.75 | | 67.7 | 67.75 |
| Base oil A-3 | | | | | | |
| Base oil B | 30 | | | 98.75 | 30 | |
| Base oil C | | | | | | |
| Base oil D | | 30 | | | | 30 |
| Base oil E | | | | | | |
| Anti-oxidant | 1 | 1 | 1 | 1 | 1 | 1 |
| Rust preventive | | | 1 | | 1 | 1 |
| Friction modifier A | | | 0.05 | | 0.05 | 0.05 |
| Friction modifier B | | | | 0.05 | 0.05 | |
| Antistatic agent A | | | | | | |
| Antistatic agent B | | | | | | |
| Antistatic agent C | 0.2 | 0.2 | 0.2 | 0.2 | 0.2 | 0.2 |
| (Total) | 100 | 100 | 100 | 100 | 100 | 100 |
| Kinematic viscosity (mm$^2$/s) at 40° C. | 8.58 | 8.71 | 8.851 | 9.009 | 8.49 | 8.95 |
| Viscosity index | 131 | 112 | 123 | 132 | 131 | 112 |
| Flash point (COC method) (° C.) | 214 | 205 | 204 | 210 | 211 | 204 |
| Pour point (° C.) | −45 | −45 | −50 | −40 | −45 | −45 |
| Volume resistivity (×10$^{10}$ Ω·cm) | 0.15 | 0.27 | 0.0135 | 0.36 | 0.0122 | 0.014 |
| Thin film residue test (80° C., 500 hr) | | | | | | |
| Percent oil retention (mass %) | 95.2 | 91.44 | 94.97 | 94.06 | 94.83 | 91.27 |
| Appearance (sludge) | No | No | No | No | No | No |

TABLE 3-3

| Lubricant composition (parts by mass) | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Base oil A-1 | | | | | | |
| Base oil A-2 | | | | | | |
| Base oil A-3 | 99 | | 98.8 | | | |
| Base oil B | | 99 | | 98.8 | | |
| Base oil C | | | | | | |
| Base oil D | | | | | 98.8 | |
| Base oil E | | | | | | 98.8 |
| Anti-oxidant | 1 | 1 | 1 | 1 | 1 | 1 |

TABLE 3-3-continued

| Lubricant composition (parts by mass) | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| Rust preventive | | | | | 1 | 1 |
| Friction modifier A | | | | | | |
| Friction modifier B | | | | | | |
| Antistatic agent A | | | 0.2 | 0.2 | | |
| Antistatic agent B | | | | | 0.2 | |
| Antistatic agent C | | | | | | 0.2 |
| (Total) | 100 | 100 | 100 | 100 | 101 | 101 |
| Kinematic viscosity (mm$^2$/s) at 40° C. | 8.34 | 11.81 | 8.41 | 8.73 | 9.686 | 8.135 |
| Viscosity index | 129 | 146 | 129 | 136 | 85 | 80 |
| Flash point (COC method) (° C.) | 210 | 218 | 208 | 218 | 202 | 156 |
| Pour point (° C.) | −45 | −27.5 | −45 | −40 | −50 | −7.5 |
| Volume resistivity (×10$^{10}$ Ω·cm) | 8 | 12.00 | 0.73 | 0.7 | 0.02 | 0.0185 |
| Thin film residue test (80° C., 500 hr) | | | | | | |
| Percent oil retention (mass %) | 99.42 | 98.2 | 99.31 | 97.86 | 67.15 | 20.88 |
| Appearance (sludge) | No | No | Yes | Yes | No | No |

INDUSTRIAL APPLICABILITY

As described hereinabove, the conductive lubricant composition of the present invention, without impairing roller bearing oil performance, can prevent anomalous wear, generation of sludge, and occurrence of static electricity which would otherwise be generated by movement of fluid. Therefore, the conductive lubricant composition is suitable for a bearing oil such as a fluid bearing oil or an oil-impregnated sintered bearing oil.

The invention claimed is:

1. A conductive lubricant composition, comprising a lubricating base oil (A) other than a silicone oil and formed of carbon, hydrogen, and oxygen and comprising 67.7-97.75 mass % based on the total mass of the composition of a monoether compound represented by formula (II):

$$R^6—O—R^7 \quad (II)$$

wherein one of $R^6$ and $R^7$ is a C1 to C24 alkyl group, and the other is a C1 to C24 alkyl group, a phenyl group, or a C7 to C24 alkylaryl group, 0.01 to 10 mass %, based on the total mass of the composition, of a non-metallic antistatic agent (B) which is a condensate product from a polyethylenepolyamine and a fatty acid, and 0.05-10 mass % based on the total mass of the composition of at least one friction modifier (C) which is an amine salt of a phosphate ester, wherein said composition exhibits a kinematic viscosity of 25 mm$^2$/s or less at 40° C., a viscosity index of 100 or higher, a flash point, as determined through the COC method, of 150° C. or higher, a pour point of −40° C. or lower, and a volume resistivity of $1.22\times10^8$-$1\times10^{10}$Ω·cm at 25° C.

2. A conductive lubricant composition as described in claim 1, which exhibits a kinematic viscosity of 20 mm$^2$/s or less at 40° C.

3. A conductive lubricant composition as described in claim 1, which exhibits a viscosity index of 120 or higher.

4. A conductive lubricant composition as described in claim 1, wherein the monoether compound is represented by formula (II):

$$R^6—O—R^7 \quad (II)$$

wherein one of $R^6$ and $R^7$ is a C1 to C24 alkyl group, and the other is a C1 to C24 alkyl group.

5. A conductive lubricant composition as described in claim 1, wherein the antistatic agent is a condensate produced from tetraethylenepentamine and a fatty acid.

6. A conductive lubricant composition as described in claim 1, wherein the lubricating base oil (A) further comprises a hydrocarbon compound.

7. A conductive lubricant composition as described in claim 1, which further comprises at least one additive selected from the group consisting of an antioxidant, an oiliness agent, a friction reducer, a rust preventive, a metal deactivator, a defoaming agent, and a viscosity index improver.

8. A bearing oil comprising a conductive lubricant composition as recited in claim 1.

9. The conductive lubricant composition according to claim 1, wherein the non-metallic antistatic agent (B) is a condensate product of tetraethylenepentamine and stearic acid.

10. The conductive lubricant composition according to claim 1, wherein said at least one friction modifier (C) is at least one salt selected from the group consisting of amine salts of compounds of formulae (IV)-(VIII):

(IV)

(V)

(VI)

(VII)

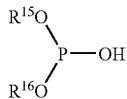

(VIII)

wherein $R^{15}$ to $R^{17}$, which may be identical to or different from one another, each represents a C4 to C30 alkyl group, an alkenyl group, an alkylaryl group, or an arylalkyl group, wherein the amine portion of said salts is a compound of the formula (IX):

(IX)

wherein $R^{18}$ represents a C3 to C30 alkyl group or alkenyl group, a C6 to C30 aryl group or arylalkyl group, or a C2 to C30 hydroxyalkyl group; p is 1, 2, or 3; when a plurality of $R^{18}$s are present they may be identical to or different from one another.

11. The conductive lubricant composition according to claim 10, wherein said compound of formula (IX) is selected from the group consisting of butylamine, pentylamine, hexylamine, cyclohexylamine, octylamine, laurylamine, stearylamine, oleylamine, benzylamine, dibutylamine, dipentylamine, dihexylamine, dicyclohexylamine, dioctylamine, dilaurylamine, distearylamine, dioleylamine, dibenzylamine, stearylmonoethanolamine, decylmonoethanolamine, hexylmonopropanolamine, benzylmonoethanolamine, phenylmonoethanolamine, tolylmonopropanol, tributylamine, tripentyl amine, trihexylamine, tricyclohexylamine, trioctylamine, trilaurylamine, tristearylamine, trioleylamine, tribenzylamine, dioleylmonoethanolamine, dilaurylmonopropanolamine, dioctylmonoethanolamine, dihexylmonopropanolamine, dibutylmonopropaolamine, oleyldiethanolamine, stearyldipropanolamine, lauryldiethanolamine, octyldipropanolamine, butyldiethanolamine, benzyldiethanolamine, phenyldiethanolamine, tolyldipronanolamine, xylyldiethanolamine, triethanolamine, and tripropanolamine.

12. A conductive lubricant composition as described in claim 1, comprising 0.01-0.2 mass %, based on the total mass of the composition, of non-metallic antistatic agent (B).

13. A conductive lubricant composition as described in claim 1, comprising 0.2 to 10 mass %, based on the total mass of the composition, of non-metallic antistatic agent (B).

* * * * *